United States Patent
Jung et al.

(10) Patent No.: US 10,135,070 B2
(45) Date of Patent: Nov. 20, 2018

(54) POSITIVE ELECTRODE ACTIVE MATERIAL SLURRY INCLUDING RUBBER-BASED BINDER AND POSITIVE ELECTRODE PREPARED THEREFROM

(71) Applicant: LG Chem, Ltd., Seoul (KR)

(72) Inventors: Do Hwa Jung, Daejeon (KR); Sang Hoon Choy, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/111,401

(22) PCT Filed: Oct. 2, 2015

(86) PCT No.: PCT/KR2015/010471
§ 371 (c)(1),
(2) Date: Jul. 13, 2016

(87) PCT Pub. No.: WO2016/053063
PCT Pub. Date: Apr. 7, 2016

(65) Prior Publication Data
US 2016/0329566 A1    Nov. 10, 2016

(30) Foreign Application Priority Data
Oct. 2, 2014 (KR) .................. 10-2014-0133472

(51) Int. Cl.
*H01M 4/62* (2006.01)
*H01M 10/0525* (2010.01)
(Continued)

(52) U.S. Cl.
CPC ......... *H01M 4/622* (2013.01); *H01M 4/0416* (2013.01); *H01M 4/139* (2013.01);
(Continued)

(58) Field of Classification Search
CPC ............... H01M 4/622; H01M 4/0416; H01M 10/0525; H01M 4/623; H01M 4/625;
(Continued)

(56) References Cited

U.S. PATENT DOCUMENTS 7,776,474 B2 * 8/2010 Taniguchi ............. H01M 4/131
429/209
2006/0115730 A1    6/2006 Taniguchi et al.
(Continued)

FOREIGN PATENT DOCUMENTS

JP    H09063590 A    3/1997
JP    H11102709A A   4/1999
(Continued)

OTHER PUBLICATIONS

International Search Report from PCT/KR2015/010471, dated Jan. 19, 2016.

*Primary Examiner* — Stewart A Fraser
(74) *Attorney, Agent, or Firm* — Lerner, David, Littenberg, Krumholz & Mentlik, LLP

(57) ABSTRACT

The present invention relates to positive electrode active material slurry of which degree of non-crystallinity is controlled by including a rubber-based binder in a specific ratio, a positive electrode including a positive electrode active material layer formed therefrom, and a lithium secondary battery including the positive electrode. The positive electrode active material layer formed from the positive electrode active material slurry has enhanced flexibility and rolling property, and internal short circuits, high voltage defects and capacity decline of the lithium secondary battery using the positive electrode including the same are capable of being suppressed.

11 Claims, 4 Drawing Sheets

EXAMPLE 1

Amorphous: 58.8%
A+ β crystal: 41.2%

EXAMPLE 2

Amorphous: 59.8%
A+ β crystal: 40.2%

COMPARATIVE EXAMPLE 1

Amorphous: 42.8%
A+ β crystal: 57.2%

(51) Int. Cl.
*H01M 4/139* (2010.01)
*H01M 10/052* (2010.01)
*H01M 4/04* (2006.01)
*H01M 4/02* (2006.01)

(52) U.S. Cl.
CPC ........... *H01M 4/623* (2013.01); *H01M 4/625* (2013.01); *H01M 10/052* (2013.01); *H01M 10/0525* (2013.01); *H01M 4/0404* (2013.01); *H01M 2004/028* (2013.01)

(58) Field of Classification Search
CPC .. H01M 4/139; H01M 10/052; H01M 4/0404; H01M 2004/028
See application file for complete search history.

(56) References Cited

U.S. PATENT DOCUMENTS

| | | |
|---|---|---|
| 2010/0209776 A1 | 8/2010 | Kim |
| 2011/0052984 A1* | 3/2011 | Nakamura .......... H01M 4/0404 429/213 |
| 2013/0011731 A1 | 1/2013 | Jeong et al. |
| 2014/0272574 A1* | 9/2014 | Son ....................... H01M 4/622 429/217 |
| 2016/0093913 A1* | 3/2016 | Saito ........................ H01M 4/13 429/246 |
| 2016/0336587 A1* | 11/2016 | Jung ....................... H01M 4/58 |

FOREIGN PATENT DOCUMENTS

| | | |
|---|---|---|
| JP | 2000021407 A | 1/2000 |
| JP | 2002260666 A | 9/2002 |
| JP | 2003331825 A | 11/2003 |
| JP | 2005123047 A | 5/2005 |
| JP | 2005243518 A | 9/2005 |
| JP | 2006185887 A | 7/2006 |
| JP | 2007128660 A | 5/2007 |
| JP | 2010027403 A | 2/2010 |
| JP | 2012009276 A | 1/2012 |
| JP | 2012028158 A | 2/2012 |
| JP | 2012174569 A | 9/2012 |
| JP | 2012221568 A | 11/2012 |
| JP | 2013077475 A | 4/2013 |
| JP | 2013127872 A | 6/2013 |
| KR | 20030033595 A | 5/2003 |
| KR | 20100092702 A | 8/2010 |
| KR | 20130085551 A | 7/2013 |
| KR | 101312265 B1 | 9/2013 |
| KR | 20130126105 A | 11/2013 |
| KR | 20140099715 A | 8/2014 |
| KR | 20140114911 A | 9/2014 |

* cited by examiner

Fig. 2
| R(mm) | EXAMPLE 1 | COMPARATIVE EXAMPLE 1 |
|---|---|---|
| 2.1mm | | |
| 1.1mm | | |
| 0.9mm | | |
Fig. 3
EXAMPLE 1
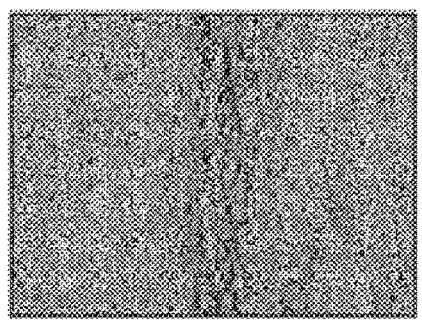
COMPARATIVE EXAMPLE 1
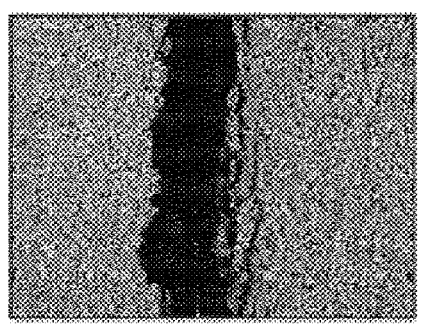

POSITIVE ELECTRODE ACTIVE MATERIAL SLURRY INCLUDING RUBBER-BASED BINDER AND POSITIVE ELECTRODE PREPARED THEREFROM

CROSS-REFERENCE TO RELATED APPLICATION

This application is a national phase entry under 35 U.S.C. § 371 of International Application No. PCT/KR2015/010471, filed Oct. 2, 2015, which claims priority to Korean Patent Application No. 10-2014-0133472, filed Oct. 2, 2014, the disclosures of which are incorporated herein by reference.

FIELD OF THE INVENTION

The present invention relates to positive electrode active material slurry of which degree of non-crystallinity is controlled by including a rubber-based binder in a specific ratio, a positive electrode including a positive electrode active material layer formed therefrom, and a lithium secondary battery including the positive electrode.

DESCRIPTION OF THE RELATED ART

With a recent rapid development of communication industries such as various information communication including an electronics industry and mobile communication, and responding to demands for lightweight, thin, short and small electronic devices, portable electronic goods such as laptop computers, netbooks, tablet PCs, mobile phones, smart phones, PDAs, digital cameras and camcorders, and communication terminal equipment have been widely used, and accordingly, interests in the development of batteries, actuating power of these devices, are also rising.

In addition, with a development of electric vehicles such as hydrogen electric vehicles, hybrid vehicles and fuel cell vehicles, interests in the development of batteries having high performance, high capacity, high density, high output and high stability have grown greatly, and a development of batteries having a rapid charge and discharge rate property have also become a big issue.

Batteries converting chemical energy to electric energy are divided into primary batteries, secondary batteries, fuel cells, solar cells and the like depending on types and characteristics of basic component materials.

Among these, primary batteries produce energy through a non-reversible reaction as in manganese batteries, alkali batteries and mercury batteries, and, despite high capacity, have a disadvantage of recycling being impossible, and accordingly, embed various problems such as energy inefficiency and environmental contamination.

Secondary batteries include lead storage batteries, nickel-metal hydride batteries, nickel-cadmium batteries, lithium ion batteries, lithium polymer batteries, lithium metal batteries and the like, and have an advantage of recycling being possible since the secondary batteries operate by a reversible reaction as a chemical battery capable of repeating charge and discharge using reversible interconversion between chemical energy and electric energy.

Among such secondary batteries, lithium secondary batteries have been actively studied, and the lithium secondary batteries have a basic constitution of a positive electrode, a negative electrode, a separator and an electrolyte.

The positive electrode and the negative electrode are electrodes in which energy conversion such as oxidation/reduction and energy storage occurs, and each has positive and negative potential. The separator is placed between the positive electrode and the negative electrode to maintain electrical insulation, and provides a transfer passage for charges. In addition, the electrolyte performs a role of a medium in charge transfer.

Meanwhile, the positive electrode may be prepared by coating positive electrode active material slurry including a positive electrode active material on a positive electrode collector and drying the result, and herein, the positive electrode active material slurry is a mixture having liquidity obtained by adding a binder and an organic solvent to a positive electrode active material and mixing the result.

Battery performance of a lithium secondary battery such as capacity is most highly influenced by a positive electrode active material used. For enhancing battery performance, high loading of a positive electrode active material is required, and a thickness of a positive electrode may increase therefrom. Accordingly, jelly roll-type polymer batteries, or methods of increasing a rolling rate in square-type batteries and circular-type batteries are used. However, cracks are developed in a positive electrode when a rolling rate increases, and internal short circuits, high voltage defects and capacity decline of a lithium secondary battery may resultantly occur.

In view of the above, the inventors of the present invention have identified that, while studying on methods of controlling a degree of non-crystallinity of positive electrode active material slurry and thereby enhancing flexibility and a rolling property of a positive electrode active material layer formed therefrom, a degree of non-crystallinity of positive electrode active material slurry is capable of being enhanced by using a binder including a rubber-based binder in a specific ratio, and accordingly, flexibility and a rolling property of a positive electrode active material layer formed from the positive electrode active material slurry are capable of being enhanced, and have completed the present invention.

DISCLOSURE OF THE INVENTION

Technical Problem

An object of the present invention is to provide positive electrode active material slurry having an enhanced degree of non-crystallinity by including a binder including a rubber-based binder.

Another object of the present invention is to provide a method for preparing the positive electrode active material slurry.

Still another object of the present invention is to provide a positive electrode including a positive electrode active material layer formed from the positive electrode active material slurry.

Moreover, still another object of the present invention provides a lithium secondary battery including the positive electrode, a negative electrode and a separator provided between the positive electrode and the negative electrode.

Technical Solution

In view of the above, one aspect of the present invention provides positive electrode active material slurry including a positive electrode active material, a binder and a conductor, wherein the binder includes a rubber-based binder in 20% by weight to 70% by weight with respect to the total weight of the binder.

Another aspect of the present invention provides a method for preparing the positive electrode active material slurry including preparing a first mixed solution by mixing a first conductor and a first binder (step 1); preparing a second mixed solution by mixing a second conductor and a second binder (step 2); and mixing the first mixed solution and the second mixed solution, adding a positive electrode active material thereto and mixing the result (step 3).

Still another aspect of the present invention provides a positive electrode including a positive electrode active material layer formed from the positive electrode active material slurry, and a lithium secondary battery including the positive electrode.

Advantageous Effects

Positive electrode active material slurry according to the present invention is capable of controlling a degree of non-crystallinity of the positive electrode active material slurry by properly controlling and including a binder that includes a rubber-based binder in a specific ratio, and accordingly, flexibility and a rolling property of a positive electrode active material layer formed from the positive electrode active material slurry may be enhanced.

In addition, a method for preparing the positive electrode active material slurry according to the present invention consecutively mixes each component forming the positive electrode active material slurry, and accordingly, positive electrode active material slurry having excellent dispersibility can be prepared since dispersibility can be enhanced and a phenomenon of tangling between conductors can be suppressed, and as a result, a positive electrode active material layer formed from the positive electrode active material slurry may have reduced thickness and loading variations.

Moreover, a positive electrode including a positive electrode active material layer formed from the positive electrode active material slurry according to the present invention has a positive electrode active material layer with excellent flexibility and an excellent rolling property, and therefore, crack development may be suppressed when manufacturing a lithium secondary battery using the same, and consequently, problems such as internal short circuits, high voltage defects and capacity decline can be prevented.

Accordingly, positive electrode active material slurry according to the present invention, a positive electrode including a positive electrode active material layer formed therefrom can be useful in industries requiring these, particularly, in a lithium secondary battery industry.

DESCRIPTION OF DRAWINGS

The drawings accompanied in the present specification illustrate preferred embodiments of the present invention, and perform a role of further illuminating technological ideas of the present invention together with the contents of the invention described above, and accordingly, the present invention is not to be interpreted limiting to the descriptions in the drawings.

FIG. 2 shows flexibility measurement results of a positive electrode according to one embodiment of the present invention.

FIG. 3 shows microscope analysis results for identifying a degree of crack development in a positive electrode according to one embodiment of the present invention.

MODE FOR CARRYING OUT THE INVENTION

Figure 1:
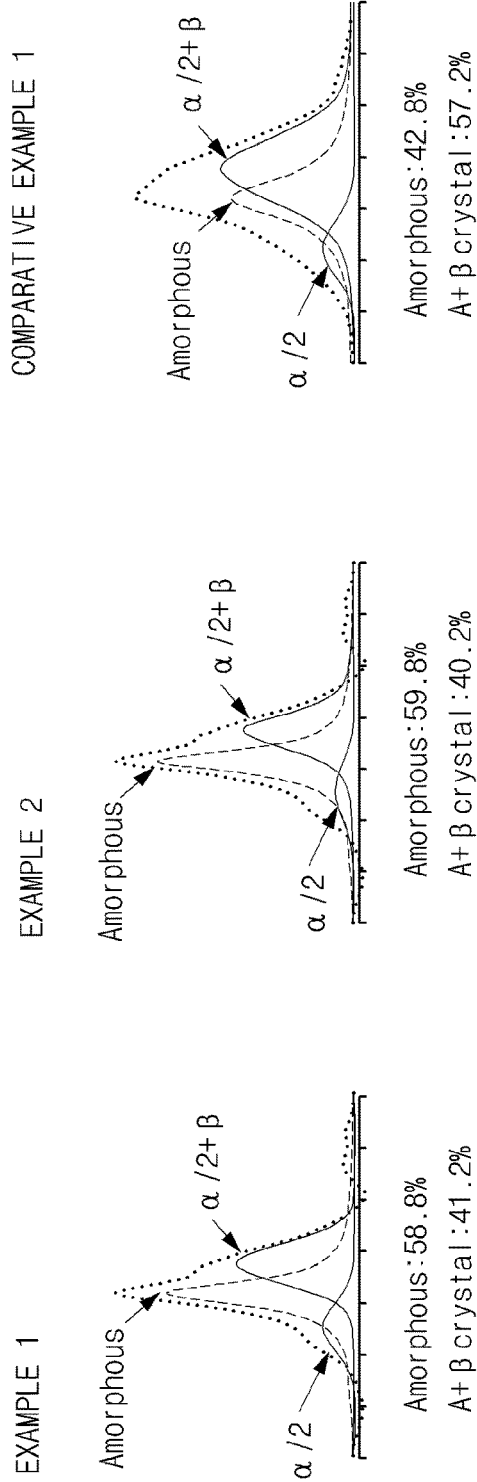
FIG. 1 shows NMR analysis results of a binder and a positive electrode active material layer according to one embodiment of the present invention.

Hereinafter, the present invention will be described in more detail in order to illuminate the present invention.

Terms or words used in the present specification and the claims are not to be interpreted limitedly to common or dictionary definitions, and shall be interpreted as meanings and concepts corresponding to technological ideas of the present invention based on a principle in which the inventors may suitably define the concepts of terms in order to describe the invention in the best possible way.

The present invention provides positive electrode active material slurry in which a degree of non-crystallinity is controlled, and capable of enhancing flexibility and a rolling property of a positive electrode active material layer.

The positive electrode active material slurry according to one embodiment of the present invention includes a positive electrode active material, a binder and a conductor, wherein the binder includes a rubber-based binder in 20% by weight to 70% by weight with respect to the total weight of the binder.

The rubber-based binder controls a degree of non-crystallinity of the binder, and, by being included in the binder in 20% by weight to 70% by weight with respect to the total weight of the binder as described above, is capable of controlling a degree of non-crystallinity of the binder and consequently controlling a degree of non-crystallinity of the positive electrode active material slurry including the binder, and as a result, is capable of enhancing flexibility and a rolling property of a positive electrode active material layer formed therefrom.

In addition, the binder may include a fluorine-based binder and a rubber-based binder, and in other words, the binder may be a mixture in which a fluorine-based binder and a rubber-based binder are mixed. Herein, the mixture may be a mixture in which the fluorine-based binder and the rubber-based binder are mixed in a weight ratio of 3:7 to 8:2. As described above, the binder performs a role of controlling a degree of non-crystallinity of the positive electrode active material slurry, and the degree of non-crystallinity may be readily controlled to a target value by mixing the fluorine-based binder and the rubber-based binder in the above-mentioned weight ratio.

The rubber-based binder may use a butadiene rubber-based binder, and specifically, may use one or more types selected from the group consisting of nitrile-butadiene rubber, hydrated nitrile-butadiene rubber, styrene-butadiene rubber and hydrated styrene-butadiene rubber.

As the fluorine-based binder, fluorine-based binders commonly known in the art may be used, and specifically, one or more types selected from the group consisting of substituted or unsubstituted polyvinylidene fluoride (PVDF), a vinylidene fluoride-hexafluoropropylene copolymer (PVDF-co-HEP), chlorotrifluoroethylene (CFTF) and polytetrafluoroethylene (PTFE) may be used.

Meanwhile, the binder may be included in the positive electrode active material slurry in 1 parts by weight to 5 parts by weight with respect to 100 parts by weight of the positive electrode active material, and the positive electrode active material slurry may have a degree of non-crystallinity of 27% to 50%.

Specifically, a degree of non-crystallinity of the positive electrode active material slurry may be controlled by the binder as described above, and by including the binder in the above-mentioned content ratio, the positive electrode active material slurry may have the degree of non-crystallinity described above, and accordingly, is capable of forming a positive electrode active material layer having excellent flexibility and a rolling property.

In addition, the conductor may include a first conductor and a second conductor, and the first conductor may be a graphite-based conductor and the second conductor may be carbon nanotubes, carbon nanofibers or a combination thereof. In other words, the conductor according to the present invention may be a conductor mixture mixing the first conductor and the second conductor, and by mixing two types of conductors, dispersibility of the conductor and the binder, particularly dispersibility of the rubber-based binder, may increase in the positive electrode active material slurry. In addition, by consecutively mixing the conductor and the binder as in a preparation method to be described below, dispersibility may be further enhanced. The first conductor and the second conductor may be mixed to have a weight ratio of 5:5 to 9:1.

The graphite-based conductor is a carbon black series material and may have a shape evolved to a three-dimensional shape or a globular shape that is not evolved, and may have a specific surface area of 300 $m^2/g$ or less.

Meanwhile, the positive electrode active material according to the present invention is not particularly limited, and those commonly known in the art may be used. Examples thereof include a compound substituted with a layer compound such as lithium cobalt oxide ($LiCoO_2$) or lithium nickel oxide ($LiNiO_2$) or with one or more transition metals; lithium manganese oxide ($LiMnO_2$); lithium copper oxide ($Li_2CuO_2$); vanadium oxide; nickel site-type lithium nickel oxide (lithiated nickel oxide); a compound having a lithium intercalation material as a main component such as lithium manganese complex oxide, disulfide compound, or complex oxide formed by a combination thereof.

The positive electrode active material slurry may, as necessary, additionally include additives such as a filler and an organic solvent in addition to the active components described above (positive electrode active material, binder and conductor).

The filler is a component suppressing expansion of a negative electrode, which may be used as necessary, and is not particularly limited as long as it is a fibrous material that does not induce chemical changes in the corresponding battery, and examples thereof may include olefin-based polymers such as polyethylene or polypropylene; or a fibrous material such as glass fiber or carbon fiber.

The organic solvent is not particularly limited, and examples thereof may include isopropyl alcohol, N-methylpyrrolidone (NMP), acetone and the like.

In addition, the present invention provides a method for preparing the positive electrode active material slurry.

The method for preparing the positive electrode active material slurry according to one embodiment of the present invention includes preparing a pre-dispersion solution by mixing a first conductor and a first binder (step 1); preparing a binder and conductor mixed solution by mixing a second conductor and a second binder to the pre-dispersion solution (step 2); and adding a positive electrode active material to the mixed solution and mixing the result (step 3).

The step 1 is a step of preparing a pre-dispersion solution by uniformly mixing a first conductor and a first binder for enhancing dispersibility of the first binder. Herein, the first conductor is a graphite-based conductor, and specifically, is as described above. The first binder is a rubber-based binder, and specifically, is as described above.

The mixing may be carried out using a mixing method commonly known in the art, and for example, may be carried out using a stirrer, a high shear mixer and the like.

The step 2 is a step of preparing a conductor and binder mixed solution by adding a second conductor and a second binder to the pre-dispersion solution, and mixing the result. Herein, the second conductor and the second binder are as described above, and the mixing may also be carried out using the method described above.

Meanwhile, amounts of the first conductor and the second conductor used in the step 1 and the step 2, respectively, may be used so that the first conductor and the second conductor have the same weight ratio in the positive electrode active material slurry as described above, and amounts of the first binder and the second binder used in the step 1 and the step 2, respectively, may be used so that the first binder and the second binder have the same weight ratio in the positive electrode active material slurry as described above.

The preparation method according to the present invention consecutively mixes the first conductor, the second conductor, the first binder and the second binder as described above instead of mixing these at once, and consequently, dispersibility between the binders and the conductors, particularly dispersibility of the rubber-based binder, may be enhanced, and tangling between the conductors may be suppressed.

The step 3 is a step of preparing positive electrode active material slurry by adding a positive electrode active material to the conductor and binder mixed solution, and mixing the result. The specific positive electrode active material is as described above.

The preparation method according to the present invention may further include adding an organic solvent after adding the positive electrode active material of the step 3, and by adding the organic solvent, a solid concentration and viscosity of the positive electrode active material slurry may be controlled. Specific types of the organic solvent are as described above.

Moreover, the present invention provides a positive electrode including a positive electrode active material layer formed from the positive electrode active material slurry.

As described above, the positive electrode according to one embodiment of the present invention includes a positive electrode active material layer formed from the positive electrode active material slurry, and the positive electrode active material layer may have a non-crystallinity ratio of 27% to 50%. Accordingly, the positive electrode active material layer may have excellent flexibility and rolling property, and as a result, processability may be excellent when manufacturing a lithium secondary battery including the positive electrode, and crack development during the process may be suppressed. Consequently, problems such as internal short circuits, high voltage defects and capacity decline of the lithium secondary battery may decline.

Meanwhile, the positive electrode according to the present invention may be prepared by coating the positive electrode active material slurry on at least one surface of a positive electrode collector, and drying the result.

The positive electrode collector may generally use those having a thickness of 3 µm to 500 µm, and is not particularly limited as long as it has high conductivity without inducing chemical changes in the corresponding battery. For example, copper, stainless steel, aluminum, nickel, titanium, baked carbon, or aluminum or stainless steel of which surface is treated with carbon, nickel, titanium, silver or the like, may be used.

The coating is not particularly limited, and may be carried out using methods commonly known in the art, and for example, may be carried out by spraying or distributing the positive electrode active material slurry on at least one surface of the positive electrode collector, and then uniformly dispersing the slurry using a doctor blade and the like. In addition to this method, methods such as die casting, comma coating and screen printing may be used.

The drying is not particularly limited, but may be carried out by heat treatment within one day in a vacuum oven at 50° C. to 200° C. Herein, the heat treatment may both include direct heating and indirect heating such as hot-air drying.

Furthermore, the present invention provides a lithium secondary battery including the positive electrode, a negative electrode, and a separator provided between the positive electrode and the negative.

The negative electrode may be prepared by coating negative electrode active material slurry on at least one surface of a negative electrode collector, and drying the result, and herein, the negative electrode active material slurry may further include additives such as a binder, a conductor and a filler in addition to the negative electrode active material.

The negative electrode active material is not particularly limited, and carbon materials capable of lithium ion intercalation and deintercalation, lithium metal, silicon, tin or the like commonly known in the art may be used. Carbon materials are preferably used, and both low crystalline carbon and high crystalline carbon may be used as the carbon material. Low crystalline carbon may include soft carbon and hard carbon, and high crystalline carbon may include natural graphite, Kish graphite, pyrolytic carbon, mesophase pitch based carbon fiber, meso-carbon microbeads, mesophase pitches and high-temperature baked carbon such as petroleum or coal tar pitch derived cokes.

The negative electrode collector may be the same as or included in the positive electrode collector described above, the conductor and the filler may be the same as those described above, and an organic solvent may be used as necessary. Herein, the organic solvent may be the same as the organic solvent described above.

The binder may be one or more types selected from the group consisting of a vinylidene fluoride-hexafluoropropylene copolymer (PVDF-co-HEP), polyvinylidene fluoride (PVDF), chlorotrifluoroethylene (CTFE), polyacrylonitrile, polymethyl methacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene-butadiene rubber (SBR) and fluorine rubber.

The coating and the drying may be the same as those described above.

The separator may be an insulating thin film having high ion permeability and mechanical strength, and may generally have a pore diameter of 0.01 µm to 10 µm and a thickness of 5 µm to 300 µm. As such a separator, a porous polymer film, for example, a porous polymer film prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber, polyethylene terephthalate fiber or the like may be used, however, the separator is not limited thereto.

In addition, the electrolyte is not particularly limited, and may include an organic solvent and a lithium salt commonly used in an electrolyte.

An anion of the lithium salt may be one or more types selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3CO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Typical examples of the organic solvent may include one or more types selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, gamma-butyrolactone, propylene sulfite and tetrahydrofuran.

Particularly, ethylene carbonate and propylene carbonate, which are cyclic carbonates, may be preferably used among the carbonate-based organic solvents, since they have a high dielectric constant as highly viscous organic solvents, and readily dissociate a lithium salt in an electrolyte, and when such a cyclic carbonate and a linear carbonate having low viscosity and a low dielectric constant such as dimethyl carbonate and diethyl carbonate are mixed in a proper ratio and used, an electrolyte liquid having high electric conductivity is capable of being prepared, which is more preferable.

In addition, for improving a charge and discharge property, a flame retarding property and the like, the electrolyte may further include, as necessary, pyridine, triethyl phosphite, triethanolamine, cyclic ether, ethylene diamine, n-glyme, hexaphosphoric acid triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride and the like. In some cases, a halogen-containing solvent such as carbon tetrachloride or ethylene trifluoride may be further added for providing nonflammability, and carbon dioxide gas may be further included for enhancing a high temperature storage property, and fluoro-ethylene carbonate (FEC), propene sultone (PRS), fluoro-propylene carbonate (FPC) and the like may be further included.

The lithium secondary battery of the present invention may be manufactured by forming an electron assembly by disposing a separator between a positive electrode and a negative electrode, placing the electrode assembly inside a cylinder-type battery case or a square-type battery case, and then injecting an electrolyte into the case. Alternatively, the lithium secondary battery of the present invention may also be manufactured by laminating the electrode assembly, immersing the electrode assembly into an electrolyte, and placing the obtained result in a battery case and sealing the result.

As the battery case used in the present invention, those commonly used in the art may be selected, and an appearance of the lithium secondary battery is not limited by the use, and a cylinder-type, a square-type, a pouch-type or a coin-type using a can, or the like may be included.

The lithium secondary battery according to the present invention may be used in a battery cell used as a power supply of small devices, but may also be preferably used as a unit battery in a medium to large sized battery module including a plurality of battery cells. Preferred examples of the medium to large sized device may include electric vehicles, hybrid electric vehicles, plug-in hybrid electric vehicles, systems for power storage and the like, but are not limited thereto.

Hereinafter, the present invention will be described in more detail with reference to the following examples and test examples. However, the following examples and test examples are for illustrative examples only, and the scope of the present invention is not limited thereto.

Example 1

1) Preparation of Positive Electrode Active Material Slurry

Denka black and styrene-butadiene rubber were mixed and pre-dispersed, and carbon nanotubes and polyvinylidene fluoride were added and mixed thereto to prepare a conductor and binder mixed solution. $LiCoO_2$ and NMP were added and mixed thereto to prepare positive electrode active material slurry. Herein, the denka black and the carbon nanotubes were used in a weight ratio of 5:5, and the styrene-butadiene rubber and the polyvinylidene fluoride were used in a weight ratio of 2:8. In addition, the total binder content (total amounts of styrene-butadiene rubber and polyvinylidene fluoride) was 2 parts by weight with respect to the total weight of the $LiCoO_2$, and the total conductor content (total amounts of denka black and carbon nanotubes) was 2 parts by weight with respect to the total weight of the $LiCoO_2$.

2) Manufacture of Lithium Secondary Battery

The prepared positive electrode active material slurry was applied on an aluminum thin film having a thickness of 20 μm, and the result was vacuum dried for 12 hours at 130° C. to prepare a positive electrode active material layer-formed positive electrode.

As a counter electrode, lithium metal foil was used, and the counter electrode and the positive electrode prepared in Example 1-1) were stamped to a coin shape. Then a carbonate-based electrolyte liquid in which 1 mol of $LiPF_6$ and 2% by weight of vinyl chloride (VC) were dissolved was injected thereto to manufacture a coin-shaped half-cell.

Example 2

A lithium secondary battery for tests was manufactured in the same manner as in Example 1 except that the styrene-butadiene rubber and the polyvinylidene fluoride were used in a weight ratio of 7:3 when preparing the positive electrode active material slurry.

Comparative Example 1

A lithium secondary battery for tests was manufactured in the same manner as in Example 1 except that only the polyvinylidene fluoride was used without using the styrene-butadiene rubber when preparing the positive electrode active material slurry.

Comparative Example 2

A lithium secondary battery for tests was manufactured in the same manner as in Example 1 except that the styrene-butadiene rubber and the polyvinylidene fluoride were used in a weight ratio of 1:9 when preparing the positive electrode active material slurry.

Comparative Example 3

A lithium secondary battery for tests was manufactured in the same manner as in Example 1 except that the styrene-butadiene rubber and the polyvinylidene fluoride were used in a weight ratio of 8:2 when preparing the positive electrode active material slurry.

Test Example 1

In order to identify an effect of a degree of non-crystallinity of the binder on crystallinity of the positive electrode active material slurry, a degree of non-crystallinity of each binder and positive electrode active material slurry used in Examples 1 and 2 and Comparative Example 1 to Comparative Example 3 was compared and analyzed. The results are shown in FIG. 1 and the following Table 1.

First, a degree of non-crystallinity for the binder in the positive electrode active material slurry was analyzed, and a degree of non-crystallinity for the positive electrode active material slurry was analyzed to measure correlation between a degree of non-crystallinity of the binder and the positive electrode active material slurry. As for a degree of non-crystallinity of the binder in the positive electrode active material slurry, each positive electrode active material slurry prepared in Examples 1 and 2 and Comparative Example 1 to Comparative Example 3 was dried for 1 hour at 150° C., and prepared as fine powders, and a degree of non-crystallinity thereof was analyzed using NMR.

A degree of non-crystallinity for the positive electrode active material slurry was measured using the same method of measuring a degree of non-crystallinity of the binder.

TABLE 1

| Category | Degree of Non-Crystallinity of Binder (%) | Degree of Non-Crystallinity of Positive Electrode Active Material Slurry (%) |
|---|---|---|
| Example 1 | 58.8 | 29.7 |
| Example 2 | 59.8 | 35 |
| Comparative Example 1 | 42.8 | 1 |
| Comparative Example 2 | 45.2 | 13.4 |
| Comparative Example 3 | 61.6 | 35.5 (Slurry Agglomeration) |

As shown in Table 1, The binders of Example 1 and Example 2 including a rubber-based binder according to the present invention in specific content exhibited a significantly higher degree of non-crystallinity compared to the binders of the comparative examples that do not include a rubber-based binder, and a degree of non-crystallinity of the positive electrode active material slurry of Example 1 and Example 2 also significantly increased compared to a degree of non-crystallinity of the positive electrode active material slurry of the comparative examples. This means that a degree of non-crystallinity of a binder may affect crystallinity of positive electrode active material slurry.

In addition, the binder of Comparative Example 2 including a rubber-based binder in a lower ratio outside the ratio range proposed in the present invention exhibited a significantly lower binder degree of non-crystallinity compared to the binders of Example 1 and Example 2, and a degree of non-crystallinity of the positive electrode active material slurry also had a significant difference. Meanwhile, the binder of Comparative Example 3 including a rubber-based binder in a higher ratio outside the ratio range proposed in the present invention exhibited a higher degree of non-crystallinity compared to the binders of Example 1 and Example 2, and the positive electrode active material slurry thereof also exhibited a high degree of non-crystallinity, however, agglomeration of the positive electrode active material slurry severely occurred.

Test Example 2

Flexibility and a rolling property of each positive electrode prepared in Example 1 and Comparative Example 1 were compared and analyzed. The analysis results are shown in FIG. 2 and FIG. 3.

Figure 4:
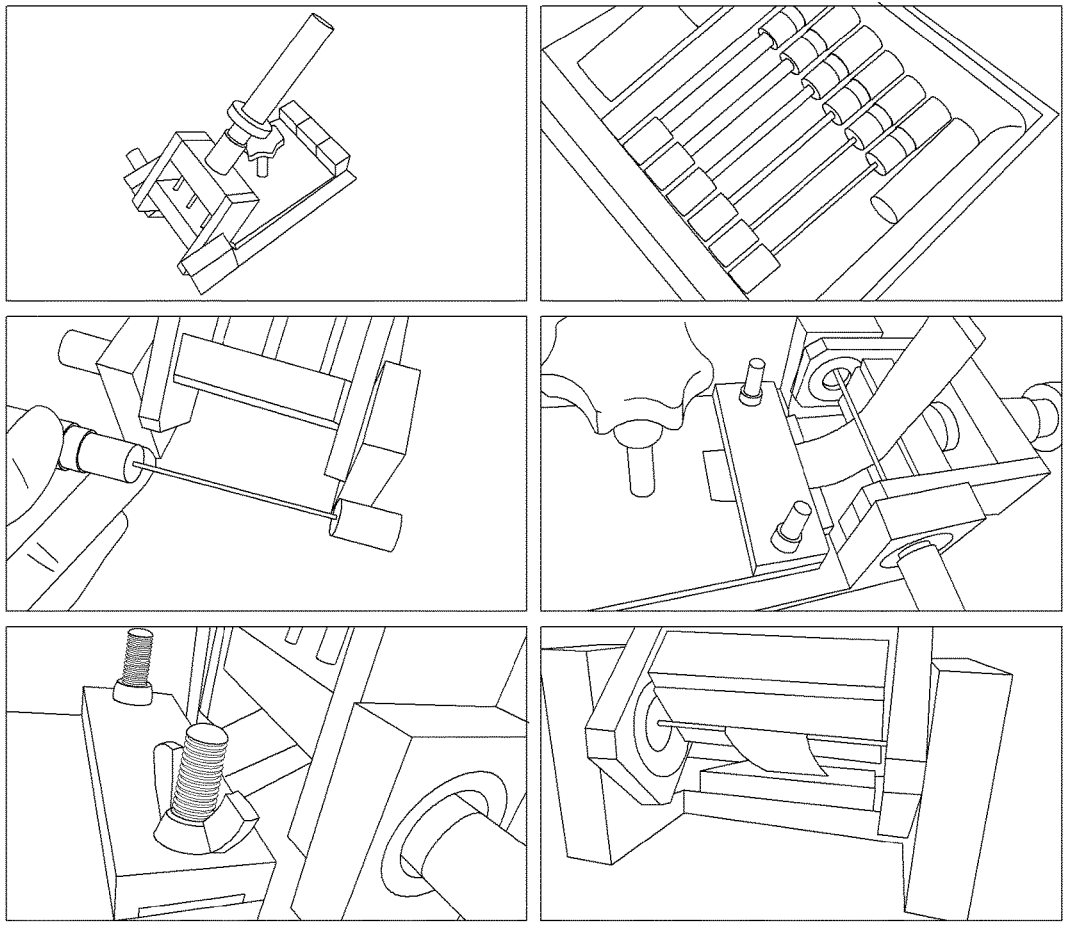
FIG. 4 shows images of a curvature measuring apparatus for measuring flexibility of a positive electrode according to one embodiment of the present invention.

As for the flexibility and the rolling property, flexibility of each positive electrode depending on a rod radius (R value) was measured using a curvature measuring apparatus shown in FIG. 4.

FIG. 2 is a surface image of each positive electrode deformed by a curvature measuring apparatus, and FIG. 3 is a photomicrograph for identifying a degree of crack development in a deformed portion of the each positive electrode.

As shown in FIG. 2 and FIG. 3, it was identified that the positive electrode of Example 1 according to the present invention had an excellent curvature property (flexibility) for all the tested R values compared to the positive electrode of Comparative Example 1.

Specifically, as shown in FIG. 2, the positive electrode of Example 1 did not have specific deformation for all the tested R values, however, the positive electrode of Comparative Example 1 experienced severe deformation as the R value decreased.

In addition, as shown in FIG. 3, the positive electrode of Example 1 did not develop cracks, however, in the positive electrode of Comparative Example 1, serious cracks were observed.

This means that a positive electrode formed from a positive electrode active material using the binder including a rubber-based binder according to the present invention in a specific ratio has excellent flexibility.

Test Example 3

A lifespan property of each lithium secondary battery manufactured in Example 1 and Comparative Example 1 was compared and analyzed. The results are shown in FIG. 5.

Each of the batteries was charged at a rate of 0.2 C with CC/CV at 23° C., and discharged to 1.5 V at a rate of 0.2 C with CC to measure charge and discharge capacity, and charge and discharge efficiency and a discharge rate property were analyzed therethrough.

Figure 5:
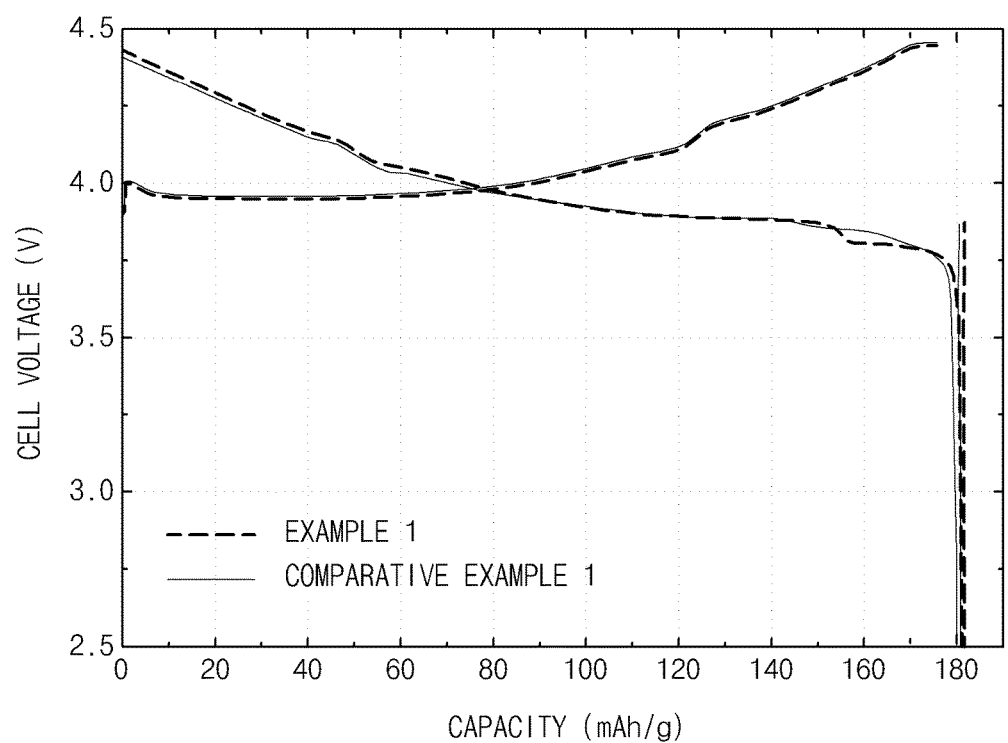
FIG. 5 is a graph showing results comparing and analyzing a capacity property of a lithium secondary battery according to one embodiment of the present invention.

As shown in FIG. 5, it was identified that the lithium secondary battery using the positive electrode of Example 1 according to the present invention had a similar level of a lifespan property with the lithium secondary battery using the positive electrode of Comparative Example 1.

What is claimed is:

1. Positive electrode active material slurry comprising:
a positive electrode active material;
a binder; and
a conductor,
wherein the binder includes a fluorine-based binder and a rubber-based binder having a weight ratio of 3:7 to 8:2 with respect to the total weight of the binder, and
wherein the conductor includes a first conductor and a second conductor, the first conductor is a graphite-based conductor, and the second conductor is carbon nanotubes, carbon nanofibers or a combination thereof.

2. The positive electrode active material slurry of claim 1, wherein the binder is included in 1 parts by weight to 5 parts by weight with respect to 100 parts by weight of the positive electrode active material.

3. The positive electrode active material slurry of claim 1, wherein the rubber-based binder is one or more types selected from the group consisting of nitrile-butadiene rubber, hydrated nitrile-butadiene rubber, styrene-butadiene rubber and hydrated styrene-butadiene rubber.

4. The positive electrode active material slurry of claim 1, wherein the fluorine-based binder is one or more types selected from the group consisting of substituted or unsubstituted polyvinylidene fluoride (PVDF), a vinylidene fluoride-hexafluoropropylene copolymer (PVDF-co-HEP), chlorotrifluoroethylene (CFTF) and polytetrafluoroethylene (PTFE).

5. The positive electrode active material slurry of claim 1, wherein the graphite-based conductor is a carbon black-based material.

6. The positive electrode active material slurry of claim 1, wherein the graphite-based conductor has a shape evolved to a three-dimensional shape or a globular shape.

7. The positive electrode active material slurry of claim 1, wherein the graphite-based conductor has a specific surface area of 10 $m^2/g$ to 300 $m^2/g$.

8. The positive electrode active material slurry of claim 1, wherein the first conductor and the second conductor have a weight ratio of 5:5 to 9:1 with respect to the total weight of the conductor.

9. A positive electrode comprising a positive electrode active material layer formed from the positive electrode active material slurry of claim 1.

10. The positive electrode of claim 9, wherein the positive electrode active material layer has a non-crystallinity ratio of 27% to 50%.

11. A lithium secondary battery comprising:
the positive electrode of claim 9;
a negative electrode; and
a separator provided between the positive electrode and the negative electrode.

* * * * *